A. FRANKS.
DIFFERENTIAL GEAR.
APPLICATION FILED FEB. 10, 1919.

1,325,938.

Patented Dec. 23, 1919.

Witnesses:
E. Alder
M. Fraiz

Inventor:
Alfred Franks
by C. Jewes
His Attorney.

UNITED STATES PATENT OFFICE.

ALFRED FRANKS, OF ILFORD, ENGLAND.

DIFFERENTIAL GEAR.

1,325,938.   Specification of Letters Patent.   Patented Dec. 23, 1919.

Application filed February 10, 1919. Serial No. 276,090.

*To all whom it may concern:*

Be it known that I, ALFRED FRANKS, a subject of the King of England, residing at Ilford, in the county of Essex, England, have invented certain new and useful Improvements in Differential Gears, of which the following is a specification.

The object of my invention is to provide a compensating or differential gear applicable to motor vehicles and the like and enabling a vehicle to be driven when one or the other of the driving shafts is broken, or when one of the wheels is unable to transmit power. This differential gear is furthermore so constructed and arranged that it is adapted to be put into or withdrawn from operation from the driver's seat by the aid of a lever or lever mechanism and notched quadrant to hold the said lever into position. These latter parts are not shown in the drawings as they are not intended to form part of my invention.

In order that the invention may be clearly understood I refer to the drawings in which:—

Similar parts are designated by like references throughout the specification.

Figure 1:
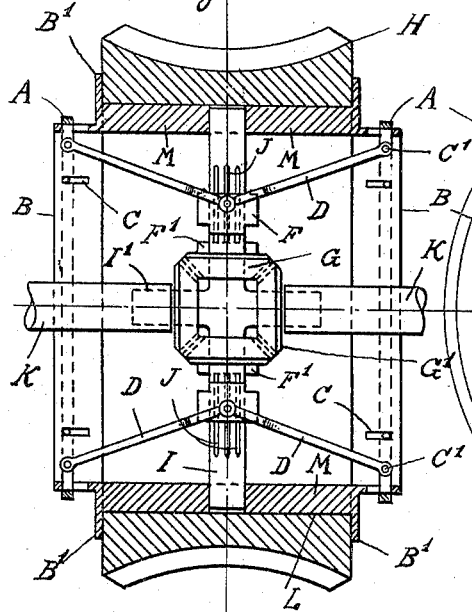
Figure 1 shows an end elevation, partly in section, of the differential gear.
Figure 2:
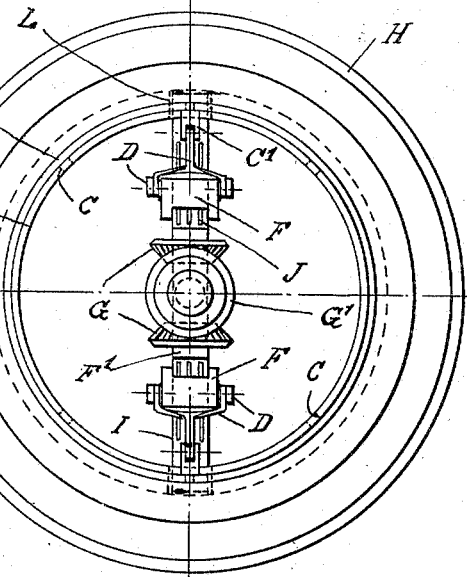
Fig. 2 shows a side view of Fig. 1.

To carry out my invention and referring to Figs. 1 and 2, I make provision of two rings A of which each is made to fit over a sleeve B mounted at either side of and firmly secured to the crown or worm wheel H by means of integral flanges $B^1$ and bolts or the like. Each of the rings A has a convenient number of projections which extend inwardly and are adapted to fit into laterally disposed elongated slots C provided in the sleeves B in such a manner, that the sleeves and rings rotate with the crown wheel H, while the rings A are allowed a certain sliding movement in the direction of the said worm wheel or crown wheel. Such sliding movement is imparted by an operating lever from the driver's seat, the mechanism effecting it not being shown.

Pivoted to the rings A, by means of a hinge joint as shown at $C^1$, Fig. 2, and diametrically opposite to one another are two pairs of rods D of which the other ends are fork-shaped and connected to the male dog F of a clutch, the other part thereof, that is the female dog $F^1$ forming part of a bevel wheel G. The two bevel wheels G are thus facing each other and are freely mounted on a cross shaft I the ends of which are projecting into transverse recesses L provided in the body of the worm or crown wheel H. This cross shaft I is held in position by extensions M which are integral with the aforementioned sleeves B and made to fit into said recesses, Fig. 1.

The male dogs F to which the rods D are connected are made slidable on the cross shaft I for which purpose a portion thereof is castellated or grooved as at J so that assuming the gear to be in the disengaged position illustrated in Fig. 1 and on the driver bringing the operating lever into action, the rings A are caused to slide in the direction of the crown wheel thereby causing, by means of the rods D, the two parts forming the clutch to engage, at the same time also causing the rotation of the two beveled wheels $G^1$ meshing with the bevel wheels G and consequently effecting a rotation of the whole device. The bevel wheels $G^1$ are mounted on axially disposed branches $I^1$ which are integral with the cross shaft I. These branches in turn are adapted to be connected to the differential shafts to be driven by fashioning the ends of the branches into square section to fit into corresponding holes or recesses in the said differential shafts K.

The differential gear described can, owing to the construction and arrangement of the parts, easily be mounted and dismounted, and in the latter case it is merely necessary to disconnect one of the sleeves B and the rings A when the center or cross shaft and the whole of the interior parts may be withdrawn from the crown or worm wheel H.

Figure 3:
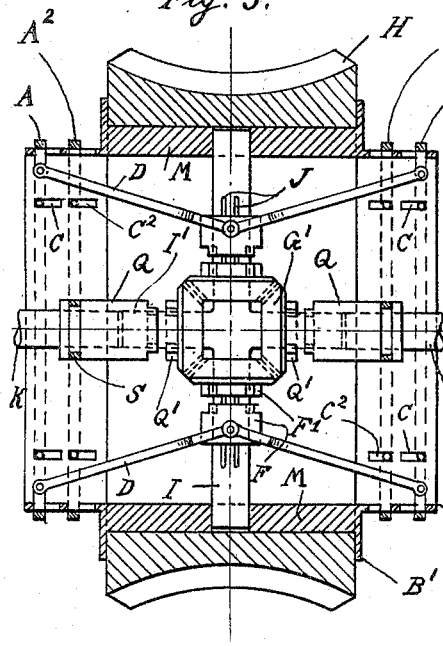
Fig. 3 shows an end elevation, partly in section, of the differential gear according to a modified construction.
Figure 4:
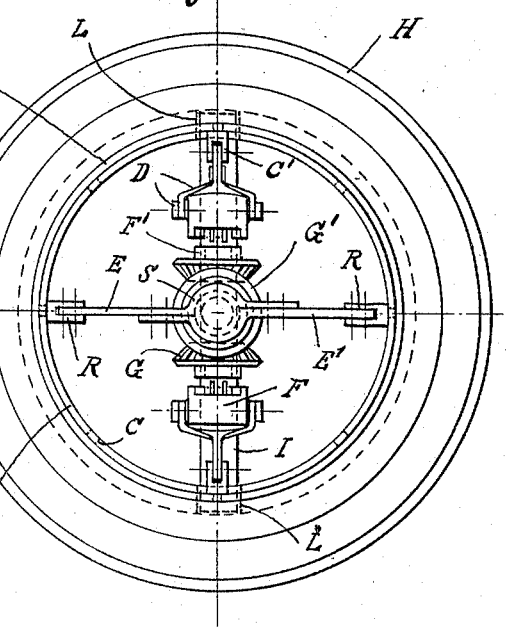
Fig. 4 shows a side view thereof.

According to the modification, Figs. 3 and 4, I provide a differential gear which is adapted for use with either a four-wheel driven vehicle and for any one of the wheels which, through one cause or another, may fail to transmit power; or for use with a two-wheel driven vehicle and for any one or both wheels as desired. The construction of part of the gear is substantially the same as described and shown with reference to Figs. 1 and 2.

In addition, however, to the ring A on each of the sleeves B, I make provision of two similar rings $A^2$, one on each sleeve and in somewhat closer proximity to the crown or worm wheel H than its neighboring ring A. The sleeves are provided with slots $C^2$ which are in line with the slots C for the rings A so that the rings $A^2$ are likewise capable of a sliding movement in the direction of the worm or crown wheel H. Both rings $A^2$ have furthermore integral projections which extend through the slots $C^2$ for the purpose already described, and each ring $A^2$ has fixed to its inner circumference, at opposite places and by means of a rigid connection R a radially disposed arm E and $E^1$ respectively. The other ends of these arms are formed into a ring or ball-race bridle S adapted to engage with the grooved portion or ball-race provided in the male dog Q mounted on the differential shafts K and $K^1$ to be driven. The female dogs $Q^1$ of the clutches thus arranged at or near either side of the worm wheel H form part of bevel wheels $G^1$ journaled on the integral and axially disposed branches $I^1$ of the cross shaft I, each of the bevel wheels $G^1$ meshing with the bevel wheels G as in the construction first described.

The inner ends of the differential shafts K and $K^1$ are of square section to receive the male dogs Q of the clutches while the cylindrically drilled inner ends of the said male dogs fit over and rest on the end of the branches $I^1$ on which the female dogs are mounted.

The engagement of the clutches F, $F^1$ is effected in the manner hereinbefore described, namely, by causing a sliding movement of the rings A in the direction of the worm wheel or crown wheel H. If, however, it is desired to cause the operation of only one or the other of the differential shafts K or $K^1$, the corresponding ring $A^2$ is made to slide thereby bringing the male dog Q with which said ring is engaged by the arm E, respectively $E^1$, into engagement with the female dog $Q^1$.

If it is desired to actuate both differential shafts K and $K^1$, the rings A and $A^2$ are slid simultaneously, thus bringing all the clutch mechanism into operation. The latter, it will be easily understood, may be of any suitable construction and adapted to the other parts described.

Having now fully described my said invention what I desire to secure by Letters Patent is:—

1. In the herein described differential gear, the combination, with a worm wheel having diametrically opposite transverse recesses at its inner circumference, of a sleeve attached at either side of said crown wheel and provided with a number of elongated laterally disposed slots and extensions which fit into said recesses, a ring fitted over each of the sleeves and having projections which correspond with and are adapted to engage the slots in the sleeves, a splined cross shaft of which the two ends project into the transverse recesses of the worm wheel and between the corresponding extensions of the said sleeves, and of which shaft the central part is formed with axially disposed branches, clutch mechanism mounted on said cross shaft, two oppositely arranged pairs of rods of which one end is pivoted to its corresponding ring and the other end to the sliding part of the clutch mechanism, bevel wheel gearing and differential shafts mounted on and adapted, respectively, to be connected to the said cross shaft branches and brought into engagement with the said clutch mechanism, all substantially as and for the purpose set forth and shown.

2. In differential gear, the combination, with a worm wheel having diametrically opposite transverse recesses at the inner circumference, of a sleeve secured to either side of the worm wheel and provided with two rows of laterally disposed elongated slots and extensions which fit into said recesses, two rings fitted at a distance from each other and over each of the sleeves and each ring having projections which correspond with and engage the said slots, two diametrically disposed arms of which one end is fixed to the inner of the rings and the other ends formed into a ring-shaped bridle, a splined cross shaft of which the ends project into the recesses in the worm wheel and fit between the extensions of the sleeves, clutch mechanism fitted on the said cross shaft and the differential shaft respectively, and means to connect the outer of said rings with the slidable member of the clutch mechanism on the cross shaft and the inner rings with the slidable member of the clutch mechanism on the differential shafts, all as and for the purpose set forth.

In testimony whereof I have hereunto set my hand in the presence of two subscribing witnesses.

ALFRED FRANKS.

Witnesses:
E. ALDER,
M. FRAISE.